United States Patent
Petovello et al.

(10) Patent No.: US 11,828,857 B2
(45) Date of Patent: *Nov. 28, 2023

(54) ESTIMATING DEVICE POSITION IN MULTIPATH ENVIRONMENTS

(71) Applicant: Apple Inc., Cupertino, CA (US)

(72) Inventors: Mark G. Petovello, Santa Cruz, CA (US); Isaac T. Miller, Half Moon Bay, CA (US); Kenneth M. Pesyna, Jr., Campbell, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/070,395

(22) Filed: Nov. 28, 2022

(65) Prior Publication Data

US 2023/0114527 A1 Apr. 13, 2023

Related U.S. Application Data

(63) Continuation of application No. 16/865,203, filed on May 1, 2020, now Pat. No. 11,513,234.

(60) Provisional application No. 62/900,411, filed on Sep. 13, 2019.

(51) Int. Cl.
*G01S 19/22* (2010.01)
*G01S 19/39* (2010.01)
*G01S 19/40* (2010.01)

(52) U.S. Cl.
CPC ............ *G01S 19/22* (2013.01); *G01S 19/393* (2019.08); *G01S 19/40* (2013.01)

(58) Field of Classification Search
CPC ......... G01S 19/22; G01S 19/393; G01S 19/40
See application file for complete search history.

(56) References Cited

U.S. PATENT DOCUMENTS

| | | |
|---|---|---|
| 5,771,456 A | 6/1998 | Pon |
| 8,044,852 B2 | 10/2011 | Green |
| 8,145,419 B2 | 3/2012 | Onome et al. |
| 8,717,233 B2 | 5/2014 | Ashjaee |
| 9,026,362 B2 | 5/2015 | Sanjay et al. |
| 9,121,936 B2 | 9/2015 | Tominaga |
| 9,268,026 B2 | 2/2016 | Shin |
| 9,513,374 B2 | 12/2016 | Deshpande |
| 9,766,349 B1 | 9/2017 | Madhow et al. |
| 9,817,102 B1 | 11/2017 | Miller |
| 11,513,234 B2 * | 11/2022 | Petovello ................ G01S 19/22 |
| 2009/0096671 A1 | 4/2009 | Mizouchi |

* cited by examiner

*Primary Examiner* — Cassi J Galt
(74) *Attorney, Agent, or Firm* — BAKERHOSTETLER

(57) ABSTRACT

A device implementing a system for estimating device position includes at least one processor configured to receive a first sensor measurement of a device at a first time, the first sensor measurement having a first variance in measurement error, and to receive a second sensor measurement of the device at a second time, the second sensor measurement having a second variance in measurement error. The at least one processor is further configured to determine a speed of the device based on at least one of the first or second sensor measurements, and adjust the second variance in measurement error based on the determined speed. The at least one processor is further configured to estimate a device position based at least in part on the first variance in measurement error and the adjusted second variance in measurement error.

20 Claims, 5 Drawing Sheets

ESTIMATING DEVICE POSITION IN MULTIPATH ENVIRONMENTS

CROSS REFERENCE TO RELATED APPLICATIONS

This application is a continuation of U.S. patent application Ser. No. 16/865,203, entitled "Estimating Device Position in Multipath Environments", filed on May 1, 2020, which claims the benefit of priority to U.S. Provisional Patent Application No. 62/900,411, entitled "Estimating Device Position in Multipath Environments", filed on Sep. 13, 2019, each of which is hereby incorporated by reference in its entirety for all purposes.

TECHNICAL FIELD

The present description relates generally to estimating device position, including estimating device position in multipath environments.

BACKGROUND

An electronic device such as a laptop, tablet, smart phone or a wearable device may include a Global Navigation Satellite System (GNSS) receiver and one or more sensors (e.g., an accelerometer, a gyroscope, etc.) that may be used in conjunction with each other to estimate the position of the electronic device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
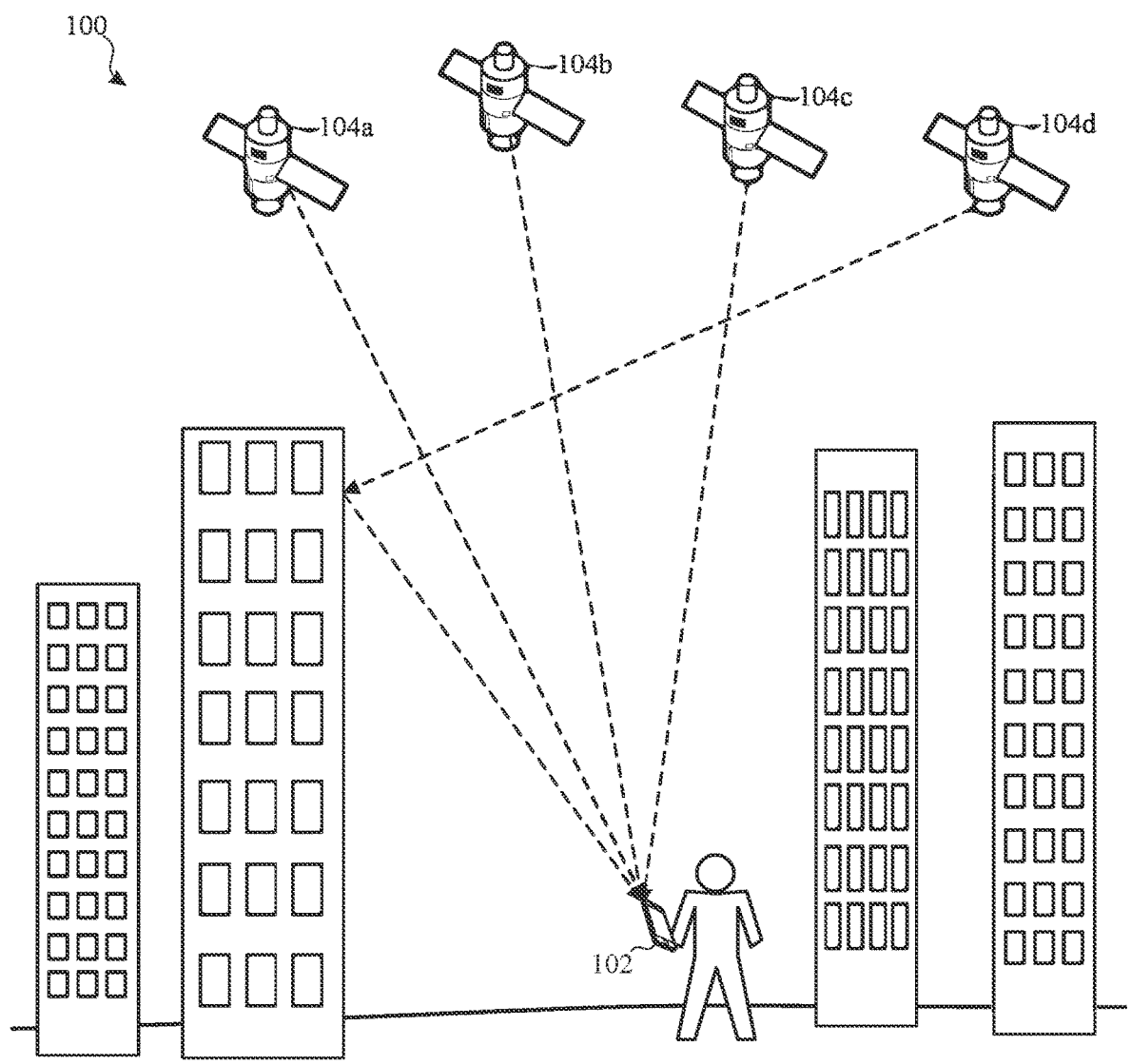
FIG. 1 illustrates an example positioning system in which an electronic device may implement the subject system for estimating device position in multipath environments in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A location estimation system implemented by an electronic device may include a Global Navigation Satellite System (GNSS) receiver, which is configured to receive signals from GNSS satellites, to estimate the position of the electronic device. However, computing an accurate position solution can be difficult in certain environments. Challenging multipath environments (e.g., dense urban canyons in which a street is flanked by buildings, and/or other areas near or within structures such as buildings) may interfere with line of sight reception of signals and can complicate the computation of an accurate position solution. In such multipath environments, signals may be reflected, refracted and/or absorbed, resulting in multiple propagation paths to the electronic device.

In general, multipath error encountered in multipath environments may be estimated based on geometry between GNSS satellite(s) and building(s). For example, multipath error may be estimated based on which reflection path(s) (e.g., via buildings) are available from a given satellite to the electronic device at a given time. Moreover, building(s) may typically have a characteristic width (e.g., 50 meters).

In a case where the user of a device is not traveling, the geometry with respect to multipath error may not change between received GNSS measurements. Similarly, in a case where the user has only traveled one meter (e.g., by walking) since a last received GNSS measurement, the geometry for the multipath error may have not changed (or any change in geometry may be insignificant), as it is unlikely the user passed building(s) resulting in different reflection path(s). However, in a case where the user has passed building(s) (e.g., by driving) since the last GNSS measurement, the geometry for the multipath error will likely have changed in a more significant manner.

In some cases, a device positioning system may assume that received GNSS measurements are independent over time. However, as seen above, multipath error may be correlated over time in some instances. In addition, multipath decorrelation time may be a function of device speed. The subject system provides for mitigating the effects of multipath error, for example, based on multipath decorrelation time being a function of device speed.

In one or more implementations, the electronic device may receive GNSS measurements, where the GNSS measurements may be associated with respective variances in measurement error (e.g., standard deviations of measurement error). When the electronic device is positioned in a dense urban canyon environment (e.g., in which buildings and/or structures may cause multipath error), the electronic device may provide for adjusting variance(s) in measurement error based on device speed. For example, the electronic device may deweight variance(s) in measurement error, where the amount of deweighting is increased for slower device speeds, when the geometry for the multipath error may remain relatively constant or slowly change, and decreased for faster device speeds, when the geometry for the multipath error may quickly change. By virtue of adjusting the variance(s) in measurement error in this manner, it is possible to mitigate the effect of multipath error, and thereby improve device position estimates in multipath environments.

FIG. 1 illustrates an example positioning system in which an electronic device may implement the subject system for estimating device position in multipath environments in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The environment 100 includes an electronic device 102 and GNSS satellites 104a, 104b, 104c and 104d (hereinafter "the GNSS satellites 104a-104d"). For explanatory purposes, the environment 100 is illustrated in FIG. 1 as including the one electronic device 102 and the four GNSS satellites 104a-104d; however, the environment 100 may include any number of electronic devices and any number of GNSS satellites. Other positioning technologies may be used independent of or in conjunction with GNSS technology to determine device position. Examples of such positioning technologies include, but are not limited to, Wi-Fi positioning, cellular phone signal positioning, Bluetooth signal positioning and/or image recognition positioning.

The electronic device 102 may be, for example, a portable computing device such as a laptop computer, a smartphone, a device embedded in, installed in, and/or coupled to a vehicle, a peripheral device (e.g., a digital camera, headphones), a tablet device, a wearable device such as a smartwatch, a band, and the like, or any other appropriate device that includes, for example, one or more wireless interfaces, such as GNSS radios, WLAN radios, cellular radios, Bluetooth radios, Zigbee radios, near field communication (NFC) radios, and/or other wireless radios. In FIG. 1, by way of example, the electronic device 102 is depicted as a smartphone. The electronic device 102 may be, and/or may include all or part of, the electronic device discussed below with respect to FIG. 2, and/or the electronic system discussed below with respect to FIG. 5.

In the example of FIG. 1, the electronic device 102 is held by or otherwise coupled to (e.g., via pocket or strap) a user. However, the electronic device 102 may be coupled to and/or contained within a vehicle. In the example of FIG. 1, the user is traveling by foot (e.g., walking). However, the user may be traveling within a vehicle (e.g., a land vehicle such as an automobile, a motorcycle, a bicycle, or a watercraft or an aircraft vehicle), on a bicycle, through water (e.g., swimming) and/or by other means.

In the environment 100, the electronic device 102 may determine its location based on signals received from GNSS satellites 104a-104d. For example, the GNSS satellites 104a-104d may be compatible with one or more of the Global Positioning System (GPS), the Globalnaya Navigazionnaya Sputnikovaya Sistema (GLONASS), the Galileo positioning system, and/or generally any positioning system.

For example, the electronic device 102 may determine its respective position (e.g., longitude, latitude, and altitude/elevation) using signals received from the GNSS satellites 104a-104d. Other positioning technologies (not shown) may be used independent of or in conjunction with GNSS (e.g., the GNSS satellites 104a-104d) to determine device location. For example, the location of the electronic device 102 may be determined based on time of arrival, angle of arrival, and/or signal strength of signals received from wireless access points which may have known locations (e.g., within a building or store, mounted on street posts, etc.). Alternatively or in addition, positioning technologies such as, but not limited to, cellular phone signal positioning, (e.g., positioning using cellular network and mobile device signals), indoor positioning systems, Bluetooth signal positioning and/or image recognition positioning may be used to determine device location.

Moreover, the electronic device 102 may implement an inertial navigation system (INS). The INS uses device sensor(s) (e.g., motion sensors such as accelerometers and/or rate gyroscopes) to calculate device state (e.g., device position, velocity, attitude) for supplementing location data provided by the above-mentioned positioning technologies in order to estimate device location.

Figure 2:
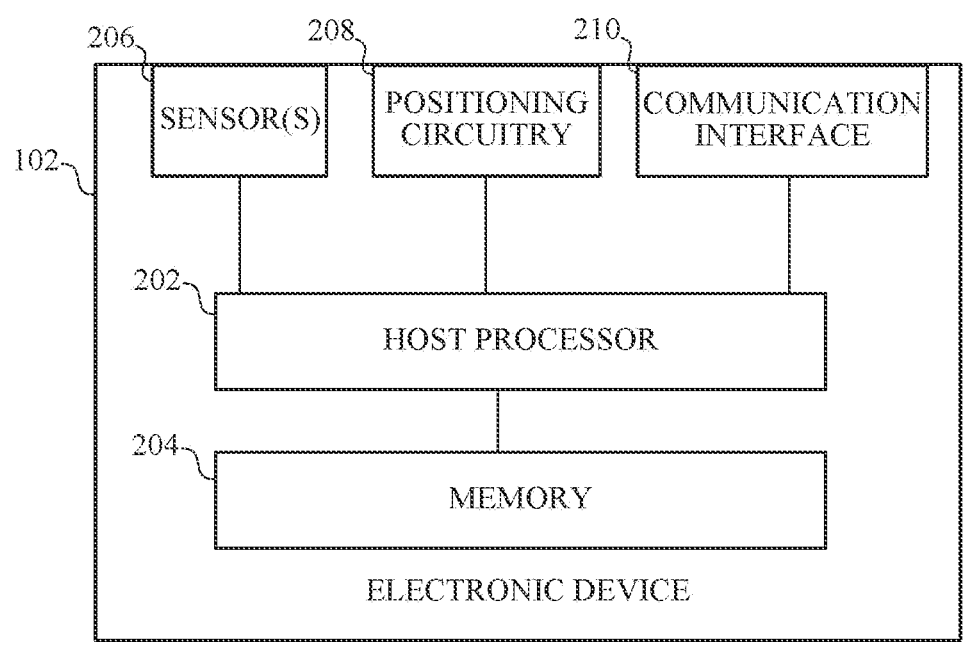
FIG. 2 illustrates an example electronic device that may implement the subject system for estimating device position in multipath environments in accordance with one or more implementations.

FIG. 2 illustrates an example electronic device that may implement the subject system for estimating device position in multipath environments in accordance with one or more implementations. For explanatory purposes, FIG. 2 is primarily described herein with reference to the electronic device 102 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a host processor 202, a memory 204, one or more sensor(s) 206, positioning circuitry 208 and a communication interface 210. The host processor 202 may include suitable logic, circuitry, and/or code that enable processing data and/or controlling operations of the electronic device 102. In this regard, the host processor 202 may be enabled to provide control signals to various other components of the electronic device 102. The host processor 202 may also control transfers of data between various portions of the electronic device 102. The host processor 202 may further implement an operating system or may otherwise execute code to manage operations of the electronic device 102.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

In one or more implementations, the memory 204 may store values for sensor signal measurements, GNSS receiver data and/or device position estimates, for example, based on motion of the electronic device 102. The memory 204 may also store component(s) and/or module(s) configured to estimate device position, for example, as discussed with respect to FIG. 3 as discussed below.

The sensor(s) 206 may include one or more motion sensor(s), such as an accelerometer and/or a gyroscope (e.g., a rate gyroscope). The motion sensor(s) may be used to facilitate movement and orientation related functions of the electronic device 102, for example, to detect movement, direction, and orientation of the electronic device 102.

Alternatively or in addition, the sensor(s) 206 may include one or more of a barometer, an electronic magnetometer, an image sensor, or generally any sensor that may be used to facilitate a positioning system. The barometer may be utilized to detect atmospheric pressure, for use in determining altitude change of the electronic device 102. The electronic magnetometer (e.g., an integrated circuit chip) may provide data used to determine device heading (e.g., the direction of magnetic north), for example to be used as part of a digital compass. The image sensor (e.g., a camera) may be used to capture images (e.g., photographs, video) to derive position and/or sequences of images to derive device motion. Captured single images and/or sequences of images may also be used to derive orientation of the image sensor (e.g., and/or electronic device 102).

The positioning circuitry 208 may be used in determining the position of the electronic device 102 based on positioning technology. For example, the positioning circuitry 208 may provide for one or more of GNSS positioning (e.g., via a GNSS receiver configured to receive signals from the GNSS satellites 104a-104d), wireless access point positioning (e.g., via a wireless network receiver configured to receive signals from wireless access points), cellular phone signal positioning, Bluetooth signal positioning (e.g., via a Bluetooth receiver), image recognition positioning (e.g., via an image sensor) and/or an INS (e.g., via motion sensors such as an accelerometer and/or gyroscope).

The communication interface 210 may include suitable logic, circuitry, and/or code that enables wired or wireless communication, such as between the electronic device 102 and other device(s). The communication interface 210 may include, for example, one or more of a Bluetooth communication interface, an NFC interface, a Zigbee communication interface, a WLAN communication interface, a USB communication interface, or generally any communication interface.

In one or more implementations, one or more of the host processor 202, the memory 204, the sensor(s) 206, the positioning circuitry 208, the communication interface 210, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
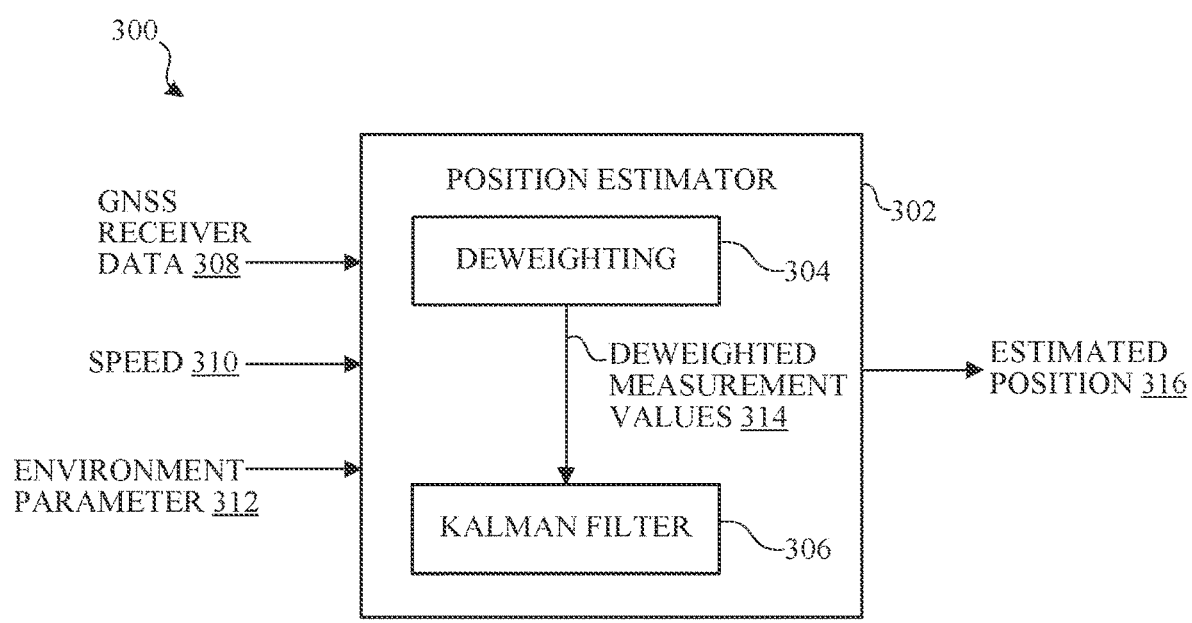
FIG. 3 illustrates an example architecture, that may be implemented by an electronic device, for estimating device position in multipath environments in accordance with one or more implementations.

FIG. 3 illustrates an example architecture 300, that may be implemented by an electronic device 102, for estimating device position in multipath environments in accordance with one or more implementations. For explanatory purposes, the architecture 300 is primarily described herein as being implemented by the electronic device 102 of FIG. 1. However, the architecture 300 is not limited to the electronic device 102 of FIG. 1, and may be implemented by one or more other components and other suitable devices (e.g., a smartwatch, a laptop computer, a tablet device, a device embedded in, installed in, and/or coupled to a vehicle, and the like). Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The architecture 300 may provide for estimating device position. As shown in the example of FIG. 3, the architecture 300 may include a position estimator 302, and the position estimator 302 may include a deweighting module 304 and a Kalman filter 306. The position estimator 302 is configured to receive one or more of GNSS receiver data 308, a speed value 310 and an environment parameter 312 as input.

In one or more implementations, the electronic device 102 may be configured to determine the environment parameter 312, which may indicate the extent to which the electronic device 102 is positioned in a dense urban canyon environment as discussed further below. When the electronic device 102 is positioned in a dense urban canyon (or similar) environment, the deweighting module 304 may deweight variance(s) in measurement error (e.g., associated with the GNSS receiver data 308) based on the speed value 310 of the electronic device 102. The deweighted measurement values 314 may be passed to the Kalman filter 306, to output an estimated position 316 of the electronic device 102.

In one or more implementations, the electronic device 102 may implement a GNSS receiver (e.g., as part of the positioning circuitry 208). The GNSS receiver may define a measurement interval (or "epoch") by which the GNSS receiver receives signals from GNSS satellites (e.g., the GNSS satellites 104a-104d). For example, the GNSS receiver may be configured to estimate a first device position at a first time, and a second device position at a second time, the first and second times being defined by the epoch.

Moreover, the Kalman filter 306 may correspond to an algorithm that uses a series of measurements/signals (e.g., which may contain noise and other inaccuracies) observed over time, and that produces estimates of unknown variables (e.g., device state and/or position) which tend to be more accurate than those based on a single measurement alone (e.g., single GNSS measurements). Thus, the Kalman filter 306 may be configured to use the GNSS receiver data 308 received over multiple epochs, in conjunction with the deweighted measurement values 314, to determine the estimated position 316.

As shown in the example of FIG. 3, the position estimator 302 may further be configured to receive the speed value 310 as input. In one or more implementations, the speed value 310 may be based on GNSS measurements (e.g., the GNSS receiver data 308) received over one or more epochs.

As noted above, the electronic device 102 may be configured to determine the environment parameter 312, indicating whether (or the extent to which) the electronic device 102 is positioned in a dense urban canyon environment. In one or more implementations, an application (e.g., a map application and/or system level process) running on the electronic device 102 may be configured to determine if a current device location (e.g., as based on the GNSS receiver data 308) corresponds to a dense urban canyon. For example, the application may access map data in the form of tiles (e.g., at multiple zoom levels), where the tiles include metadata indicating an environment (e.g., dense urban canyon, rural, and the like) associated with current device location. The environment parameter 312 may be a parameter provided by such application (e.g., map application) to the position estimator 302.

In one or more implementations, the electronic device 102 may be configured to determine and/or receive respective variances in measurement error for GNSS measurements (e.g., corresponding to the GNSS receiver data 308). For example, for a given GNSS measurement, the respective variance in measurement error may correspond to a standard deviation of measurement error for that GNSS measurement.

As noted above, some positioning systems may assume that received GNSS measurements and their corresponding variances in measurement error are independent over time. However, as described herein, the architecture 300 (e.g., including the deweighting module 304) is configured to account for multipath error being correlated over time, and/or multipath decorrelation over time being a function of device speed.

In one or more implementations, the deweighting module 304 may be configured to compensate for the time correlation between multipath error and device speed (e.g., the speed value 310). For example, the faster the electronic device 102 is traveling (e.g., vehicle motion), the more likely the surrounding geometry of nearby buildings in a dense urban canyon environment will change over time (e.g., by passing buildings), resulting in less deweighting (e.g., of the variance in measurement error) performed by the deweighting module 304. On the other hand, the slower the electronic device 102 is traveling (e.g., walking and no travel), the less likely the surrounding geometry of nearby buildings in a dense urban canyon environment will change (e.g., by not passing buildings), resulting in more deweighting (e.g., of the variance in measurement error) performed by the deweighting module 304. The deweighting of the variance in the measurement errors is discussed further below with respect to Equations (1)-(14).

In one or more implementations, Equation (1) corresponds to receiving GNSS measurements (e.g., corresponding to the GNSS receiver data 308), as follows:

$$z = \begin{bmatrix} z_1 \\ z_2 \end{bmatrix} \quad \text{Equation (1)}$$

In Equation (1), measurements $z_1$ and $z_2$ may represent GNSS measurements received at times 1 and 2 (e.g., corresponding to an epoch). These two values are represented by vector z. As noted above, some device positioning system(s) may assume that measurements $z_1$ and $z_2$ are independent measurements, such that errors associated with these measurements are unrelated. The architecture 300 is configured to account for the above-mentioned correlation with respect to measurement error.

In one or more implementations, the Kalman filter 306 may be preconfigured to assume that GNSS measurements $z_1$ and $z_2$ are independent. Thus, rather than redesigning the filtering framework of the Kalman filter 306 itself (e.g., by augmenting the Kalman filter 306 to include a time correlation state), the deweighting module 304 may adjust the variance in measurement error (e.g., standard deviation of measurement error) prior to providing these value(s) to the Kalman filter 306.

Equation (2) corresponds to a measurement covariance matrix R for describing the relationship between the two measurements $z_1$ and $z_2$.

$$R = \begin{bmatrix} \sigma_1^2 & \sigma_{12} \\ \sigma_{12} & \sigma_2^2 \end{bmatrix} = \begin{bmatrix} \sigma_1^2 & \sigma_1 \sigma_2 \rho \\ \sigma_1 \sigma_2 \rho & \sigma_2^2 \end{bmatrix} \quad \text{Equation (2)}$$

In Equation (2), $\sigma_1$ represents the standard deviation of the measurement error associated with $z_1$, and $\sigma_2$ represents the standard deviation of the measurement error associated with $z_2$. Moreover, the cross terms in the measurement covariance matrix R may account for measurements being correlated, with ρ representing the correlation coefficient between the measurements $z_1$ and $z_2$. In one or more implementations, ρ may vary between −1 to 1. For example, a value of −1 for ρ may indicate that the measurements $z_1$ and $z_2$ are oppositely correlated, a value of 1 for ρ may indicate that the measurements are perfectly correlated (e.g., where if one measurement goes up, the other measurement goes up), and a value of 0 for ρ may indicate that the measurements are uncorrelated (e.g., corresponding to the above-mentioned assumption for some device position estimators). In one or more implementations, ρ may be a function of speed and environment as described herein.

Equation (3) corresponds to an inverse $R^{-1}$ of the measurement covariance matrix R, as follows:

$$R^{-1} = \frac{1}{1-\rho^2} \begin{bmatrix} \frac{1}{\sigma_1^2} & -\frac{\rho}{\sigma_1 \sigma_2} \\ -\frac{\rho}{\sigma_1 \sigma_2} & \frac{1}{\sigma_2^2} \end{bmatrix} \quad \text{Equation (3)}$$

In one or more implementations, Equation (3) may be simplified, for example, by assuming $H_1=H_2=1$, such that $H^T=[1\ 1]$. Using least-squares estimation, the covariance matrix P of the state vector may be determined as shown in Equations (4)-(5) as follows:

$$P = (H^T R^{-1} H)^{-1} \quad \text{Equation (4)}$$

$$= \left( \frac{1}{1-\rho^2} \left[ \frac{1}{\sigma_1^2} + \frac{1}{\sigma_2^2} - \frac{2\rho}{\sigma_1 \sigma_2} \right] \right)^{-1} \quad \text{Equation (5)}$$

Thus, P may correspond to the covariance matrix of the device state, for example, where the device state corresponds to the position of the electronic device 102 (e.g., per the GNSS measurements).

As noted above, a Kalman filter (e.g., the Kalman filter 306) may not typically be configured to handle time-correlation internally, and may instead assume that GNSS measurements (e.g., corresponding to the GNSS receiver data 308) are independent over time. In one or more implementations, Equation (6) includes a value k as follows:

$$R' = \begin{bmatrix} \sigma_1^2 & 0 \\ 0 & k^2 \sigma_2^2 \end{bmatrix} \quad \text{Equation (6)}$$

With respect to Equation (6), the architecture 300 (e.g., including the deweighting module 304) may determine a value for k such that updating the device state (e.g., assuming independent measurements) with the covariance matrix given by (e.g., $\sigma_1'=\sigma_1, \sigma_{12}'=0, \sigma_1'=k\sigma_2$) may yield the equivalent state covariance matrix as when using the full covariance matrix in the above Equation (2). In one or more implementations, the value of k (e.g., the deweighting value) may be retrieved from a lookup table which associates deweighting values with respective device speeds and environments (e.g., corresponding to the correlation coefficient ρ).

In one or more implementations, using the inverse of Equation (5), Equation (6) may be written as follows with respect to Equations (7)-(13):

$$P^{-1}|_{R'} = P^{-1}|_R \quad \text{Equation (7)}$$

$$\frac{1}{\sigma_1^2} + \frac{1}{k^2 \sigma_2^2} = \frac{1}{1-\rho^2} \left[ \frac{1}{\sigma_1^2} + \frac{1}{\sigma_2^2} - \frac{2\rho}{\sigma_1 \sigma_2} \right] \quad \text{Equation (8)}$$

$$\frac{1}{\sigma_1^2} + \frac{1}{k^2 \sigma_2^2} = \left( \frac{1}{1-\rho^2} \frac{1}{\sigma_1^2} \right) + \frac{1}{1-\rho^2} \left[ \frac{1}{\sigma_2^2} - \frac{2\rho}{\sigma_1 \sigma_2} \right] \quad \text{Equation (9)}$$

$$\frac{1}{\sigma_1^2} + \frac{1}{k^2 \sigma_2^2} = \left( \frac{1}{\sigma_1^2} + \frac{\rho^2}{(1-\rho^2)\sigma_1^2} \right) + \frac{1}{1-\rho^2} \left[ \frac{1}{\sigma_2^2} - \frac{2\rho}{\sigma_1 \sigma_2} \right] \quad \text{Equation (10)}$$

$$\frac{1}{k^2 \sigma_2^2} = \frac{1}{1-\rho^2} \left[ \frac{\rho^2}{\sigma_1^2} + \frac{1}{\sigma_2^2} - \frac{2\rho}{\sigma_1 \sigma_2} \right] \quad \text{Equation (11)}$$

$$k^2 = (1-\rho^2) \left[ \frac{\rho^2}{\sigma_1^2} + \frac{1}{\sigma_2^2} - \frac{2\rho}{\sigma_1 \sigma_2} \right]^{-1} \quad \text{Equation (12)}$$

-continued $$k^2 = \frac{1-\rho^2}{\sigma_2^2}\left[\frac{\rho^2}{\sigma_1^2} + \frac{1}{\sigma_2^2} - \frac{2\rho}{\sigma_1\sigma_2}\right]^{-1} \quad \text{Equation (13)}$$

Thus, in one or more implementations, the deweighting module 304 may provide for variance with respect to the first measurement $z_1$ to be unchanged, and for variance with respect to the second measurement $z_2$ to be deweighted by a factor of k (e.g., or $k^2$). In this manner, k may be solved such that the covariance matrix for the estimated state (e.g., P) corresponding to the covariance matrix R from Equation (2), and the covariance matrix given by (e.g., $\sigma_1'=\sigma_1$, $\sigma_{12}'=0$, $\sigma_1'=k\sigma_2$), may be the same.

Thus, in one or more implementations, the value k indicates a deweighting value (e.g., to determine the deweighted measurement values 314). For example, given a first GNSS measurement (e.g., $z_1$), k indicates how much the variance associated with a second GNSS measurement (e.g., $z_2$) is to be deweighted, such that the collective information between the two measurements reflects the time correlation between them.

In one or more implementations, the Equation (13) may be simplified as shown in Equation (14) below.

$$k = \frac{1+\rho}{(1-\rho)} \quad \text{Equation (14)}$$

With respect to Equation (14), the deweighting module 304 may assume that $\sigma_1 = \sigma_2 = G$. For example, for values of $k \in [0.8, 1.2]$, the approximation corresponding to Equation (14) may generally be accurate.

Thus, with reference to FIG. 3, the position estimator 302 may be configured to receive GNSS measurements (e.g., $z_1$ and $z_2$), which are associated with respective variances in measurement error (e.g., standard deviations of measurement error $\sigma_1$ and $\sigma_2$). Based on the environment parameter 312, the deweighting module 304 may determine a deweighting value(s) (e.g., k) by which to deweight the variances in measurement error (e.g., $\sigma_2$) as a function of device speed (e.g., the speed value 310). The correlation coefficient (e.g., $\rho$) may be a function of speed (e.g., the speed value 310) and environment (e.g., the environment parameter 312).

As shown in the above examples with respect to Equations (1)-(14), the variance in measurement error associated with the second measurement $z_2$ is deweighted. However, the architecture 300 is not limited to deweighting this value, and may be configured to deweight variations in measurement error associated with other measurements (e.g., the first measurement $z_1$ and/or subsequently received GNSS measurements). The deweighted measurement value(s) 314 (e.g., based on k) as determined by the deweighting module 304 may be passed to the Kalman filter 306, to output an estimated position 316 of the electronic device 102. For example, the Kalman filter 306 may use the GNSS receiver data 308 received over multiple epochs, in conjunction with the deweighted measurement values 314, to determine the estimated position 316 on an epoch-by-epoch basis.

In one or more implementations, one or more of components of the position estimator 302, the deweighting module 304 and the Kalman filter 306 are implemented as software instructions, stored in the memory 204, which when executed by the host processor 202, cause the host processor 202 to perform particular function(s).

In one or more implementations, one or more of components of the position estimator 302, the deweighting module 304 and the Kalman filter 306 may be implemented in software (e.g., subroutines and code), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 4:
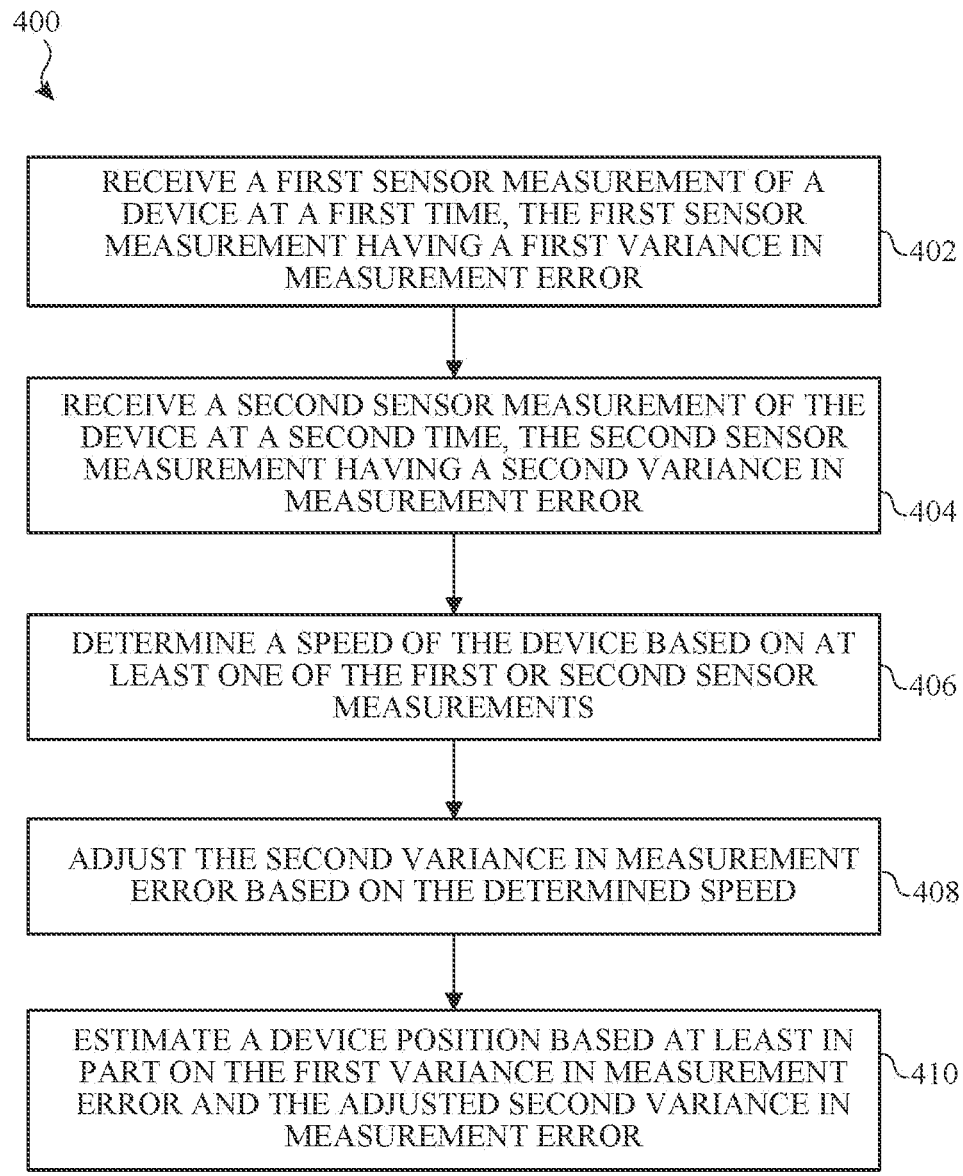
FIG. 4 illustrates a flow diagram of an example process for estimating device position in multipath environments in accordance with one or more implementations.

FIG. 4 illustrates a flow diagram of an example process for estimating device position in multipath environments in accordance with one or more implementations. For explanatory purposes, the process 400 is primarily described herein with reference to the electronic device 102 of FIG. 1. However, the process 400 is not limited to the electronic device 102 and one or more blocks (or operations) of the process 400 may be performed by one or more other components of the electronic device 102, and/or by other suitable devices. Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

The electronic device 102 receives a first sensor measurement at a first time, the first sensor measurement having a first variance in measurement error (402). The electronic device 102 receives a second sensor measurement at a second time, the second sensor measurement having a second variance in measurement error (404).

The first and second sensor measurements may include respective Global Navigation Satellite System (GNSS) measurements. The first and second variances in measurement error may correspond to respective standard deviations of measurement error.

The electronic device 102 determines a device speed based on at least one of the first or second sensor measurements (406). The electronic device 102 adjusts the second variance in measurement error based on the determined speed (408). Adjusting the second variance in measurement error may be further based on at least one of the first sensor measurement or the second sensor measurement indicating the electronic device 102 being positioned within a dense urban environment.

Adjusting the second variance in measurement error may include applying a deweighting value to the second variance in measurement error. The deweighting value may increase relative to a decrease in the device speed. For example, the deweighting value may increase proportionally relative to a decrease in the device speed. Adjusting the second variance in measurement error may correspond with compensating for time correlation associated with receiving the first sensor measurement at the first time and receiving the second sensor measurement at the second time. The deweighting value may be retrieved from a lookup table which associates deweighting values with respective device speeds and environments.

The electronic device 102 estimates a device position based at least in part on the first variance in measurement error and the adjusted second variance in measurement error (410). Estimating the device position may be further based on the first and second sensor measurements. The first variance in measurement error and the adjusted second variance in measurement error may be provided to a Kalman filter to estimate the device position.

As described above, one aspect of the present technology is the gathering and use of data available from specific and legitimate sources for estimating device position. The present disclosure contemplates that in some instances, this gathered data may include personal information data that uniquely identifies or can be used to identify a specific person. Such personal information data can include demographic data, position-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used for estimating device position. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of estimating device position, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting position data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 5:
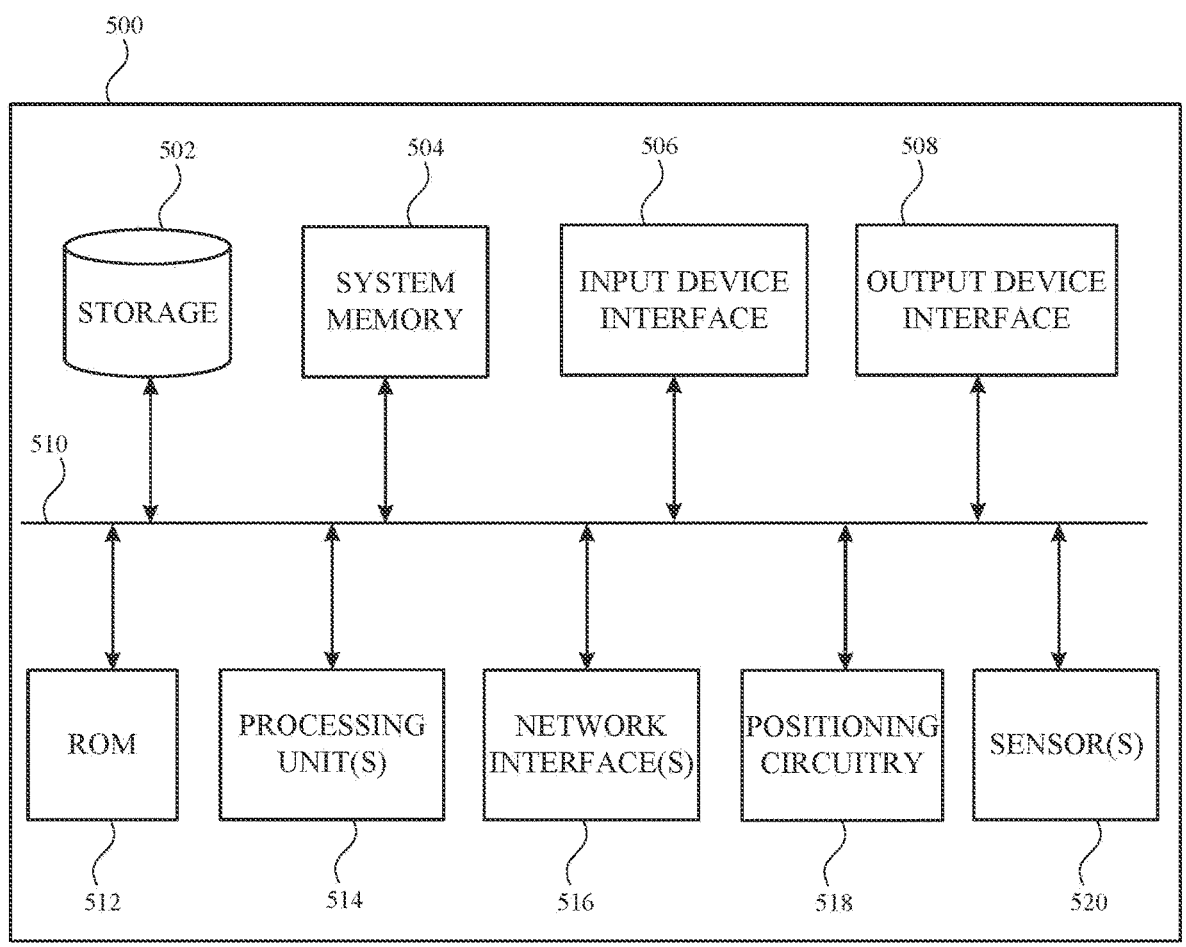
FIG. 5 illustrates an example electronic system with which aspects of the subject technology may be implemented in accordance with one or more implementations.

FIG. 5 illustrates an example electronic system with which aspects of the subject technology may be implemented in accordance with one or more implementations. The electronic system 500 can be, and/or can be a part of, any electronic device for generating the features and processes described in reference to FIGS. 1-4, including but not limited to a laptop computer, tablet computer, smartphone, and wearable device (e.g., smartwatch, fitness band). The electronic system 500 may include various types of computer readable media and interfaces for various other types of computer readable media. The electronic system 500 includes one or more processing unit(s) 514, a permanent storage device 502, a system memory 504 (and/or buffer), an input device interface 506, an output device interface 508, a bus 510, a ROM 512, one or more processing unit(s) 514, one or more network interface(s) 516, positioning circuitry 518, sensor(s) 520, and/or subsets and variations thereof.

The bus 510 collectively represents all system, peripheral, and chipset buses that communicatively connect the numerous internal devices of the electronic system 500. In one or more implementations, the bus 510 communicatively connects the one or more processing unit(s) 514 with the ROM 512, the system memory 504, and the permanent storage device 502. From these various memory units, the one or more processing unit(s) 514 retrieves instructions to execute and data to process in order to execute the processes of the subject disclosure. The one or more processing unit(s) 514 can be a single processor or a multi-core processor in different implementations.

The ROM 512 stores static data and instructions that are needed by the one or more processing unit(s) 514 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 514 may need at runtime. In one or more implementations, the processes of the subject disclosure are stored in the system memory 504, the permanent storage device 502, and/or the ROM 512. From these various memory units, the one or more processing unit(s) 514 retrieves instructions to execute and data to process in order to execute the processes of one or more implementations.

The bus 510 also connects to the input and output device interfaces 506 and 508. The input device interface 506 enables a user to communicate information and select commands to the electronic system 500. Input devices that may be used with the input device interface 506 may include, for example, alphanumeric keyboards and pointing devices (also called "cursor control devices"). The output device interface 508 may enable, for example, the display of images generated by electronic system 500. Output devices that may be used with the output device interface 508 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus 510 also connects to positioning circuitry 518 and sensor(s) 520. The positioning circuitry 518 may be used in determining device position based on positioning technology. For example, the positioning circuitry 518 may provide for one or more of GNSS positioning, wireless access point positioning, cellular phone signal positioning, Bluetooth signal positioning, image recognition positioning, and/or an INS (e.g., via motion sensors such as an accelerometer and/or gyroscope).

In one or more implementations, the sensor(s) 520 may be utilized to detect movement, travel and orientation of the electronic system 500. For example, the sensor(s) may include an accelerometer, a rate gyroscope, and/or other motion-based sensor(s). Alternatively or in addition, the sensor(s) 520 may include one or more audio sensors(s) and/or image-based sensor(s) for determining device position and/or orientation. In another example, the sensor(s) 520 may include a barometer which may be utilized to detect atmospheric pressure (e.g., corresponding to device altitude).

Finally, as shown in FIG. 5, the bus 510 also couples the electronic system 500 to one or more networks and/or to one or more network nodes through the one or more network interface(s) 516. In this manner, the electronic system 500 can be a part of a network of computers (such as a LAN, a wide area network ("WAN"), or an Intranet, or a network of networks, such as the Internet. Any or all components of the electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   receiving a sensor measurement of a device;
   determining a speed of the device
   adjusting a variance corresponding to the sensor measurement based on the determined speed, wherein the adjusting comprises applying a deweighting value to the variance, the applied deweighting value increasing relative to a decrease in the determined speed; and
   estimating a device position based at least in part on the adjusted variance.

2. The method of claim 1, wherein the sensor measurement comprises at least one Global Navigation Satellite System (GNSS) measurement.

3. The method of claim 1, wherein estimating the device position is further based on the sensor measurement.

4. The method of claim 1, wherein the variance corresponding to the measurement corresponds to a standard deviation of measurement error.

5. The method of claim 1, wherein adjusting the variance corresponding to the sensor measurement is further based on the sensor measurement indicating the device being positioned within a dense urban environment.

6. The method of claim 1, wherein the variance corresponding to the sensor measurement is provided to a Kalman filter to estimate the device position.

7. The method of claim 1, wherein the deweighting value is retrieved from a lookup table which associates deweighting values with respective device speeds and environments.

8. A device, comprising:
at least one processor; and
a memory including instructions that, when executed by the at least one processor, cause the at least one processor to:
receive a sensor measurement of the device;
determine a speed of the device;
adjust a variance corresponding to the sensor measurement based on the determined speed, wherein the adjusting comprises applying a deweighting value to the variance, the applied deweighting value increasing relative to a decrease in the determined speed; and
estimate a device position based at least in part on the adjusted variance.

9. The device of claim 8, wherein the sensor measurement comprises at least one Global Navigation Satellite System (GNSS) measurement.

10. The device of claim 8, wherein estimating the device position is further based on the sensor measurement.

11. The device of claim 8, wherein the variance in corresponding to the sensor measurement is corresponds to a standard deviation of measurement error.

12. The device of claim 8, wherein adjusting the variance corresponding to the sensor measurement is further based on the sensor measurement indicating the device being positioned within a dense urban environment.

13. The device of claim 8, wherein the variance corresponding to the sensor measurement is provided to a Kalman filter to estimate the device position.

14. The device of claim 8, wherein the deweighting value is retrieved from a lookup table which associates deweighting values with respective device speeds and environments.

15. A non-transitory computer-readable storage medium comprising instructions that, when executed by one or more processors, cause the one or more processors to perform operations comprising:
receiving a sensor measurement of a device;
determining a speed of the device;
adjusting a variance corresponding to the sensor measurement based on the determined speed, wherein the adjusting comprises applying a deweighting value to the variance, the applied deweighting value increasing relative to a decrease in the determined speed; and
estimating a device position based at least in part on the adjusted variance.

16. The non-transitory computer-readable storage medium of claim 15, wherein the sensor measurement comprises at least one Global Navigation Satellite System (GNSS) measurement.

17. The non-transitory computer-readable storage medium of claim 15, wherein estimating the device position is further based on the sensor measurement.

18. The non-transitory computer-readable storage medium of claim 15, wherein the variance corresponding to the measurement corresponds to a standard deviation of measurement error.

19. The non-transitory computer-readable storage medium of claim 15, wherein adjusting the variance corresponding to the sensor measurement is further based on the sensor measurement indicating the device being positioned within a dense urban environment.

20. The non-transitory computer-readable storage medium of claim 15, wherein the variance corresponding to the sensor measurement is provided to a Kalman filter to estimate the device position.

* * * * *